United States Patent
Chen (10) Patent No.: US 6,282,984 B1
(45) Date of Patent: Sep. 4, 2001

(54) BICYCLE PEDAL ASSEMBLY WITH TWO IDENTICAL ANCHORING FRAMES FOR ENGAGING AND RETAINING A CLEAT UNIT ON THE TOP OR BOTTOM OF THE PEDAL BODY

(76) Inventor: Chung-I Chen, No. 3, Kung-Chi Rd., Yu-Ssi-Kung-Yeh Dist., Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 09/354,888

(22) Filed: Jul. 16, 1999

(30) Foreign Application Priority Data

Jun. 11, 1999 (TW) .................................................. 88209655

(51) Int. Cl.⁷ ........................................................ B62M 3/08
(52) U.S. Cl. .................................................................. 74/594.6
(58) Field of Search ............................... 74/594.6, 594.4; 36/131

(56) References Cited

U.S. PATENT DOCUMENTS 5,003,841 * 4/1991 Nagano ............................ 74/594.6 X
5,557,985 * 9/1996 Nagano ................................ 74/594.6
5,727,429    3/1998 Ueda ..................................... 74/596.4
5,755,144    5/1998 Ueda ..................................... 74/594.6
5,778,739    7/1998 Takahama ............................ 74/594.6
5,868,043 * 2/1999 Ueda ..................................... 74/594.6
6,014,914 * 1/2000 Ueda ..................................... 74/594.6

* cited by examiner

Primary Examiner—Rodney H. Bonck
Assistant Examiner—Ankur Parekh
(74) Attorney, Agent, or Firm—Fish & Richardson P.C.

(57) ABSTRACT

A bicycle pedal assembly includes a one-piece pedal body having a front pair and a rear pair of left and right walls, and front and rear anchoring frames pivotably mounted on the front and the rear pairs of the left and right walls, respectively. Each of an upper engaging wall of the front anchoring frame and a lower engaging wall of the rear anchoring frame is formed with a first anchoring portion. Each of an upper engaging wall of the rear anchoring frame and a lower engaging wall of the front anchoring frame is formed with a second anchoring portions. The first anchoring portion on each of the anchoring frames faces the second anchoring portion on the other one of the anchoring frames and cooperates with the second anchoring portion so as to be adapted to engage a cleat unit and to retain the cleat unit on the pedal body.

2 Claims, 9 Drawing Sheets

BICYCLE PEDAL ASSEMBLY WITH TWO IDENTICAL ANCHORING FRAMES FOR ENGAGING AND RETAINING A CLEAT UNIT ON THE TOP OR BOTTOM OF THE PEDAL BODY

BACKGROUND OF THE INVENTION

1. Field of the Invention

The present invention relates to a pedal assembly, more particularly to a bicycle pedal assembly.

2. Description of the Related Art

A conventional bicycle pedal assembly is adapted to be mounted on a bicycle pedal shaft and to engage a cleat unit fixed to a bottom surface of a sole of a cyclist's shoe.

Figure 1:
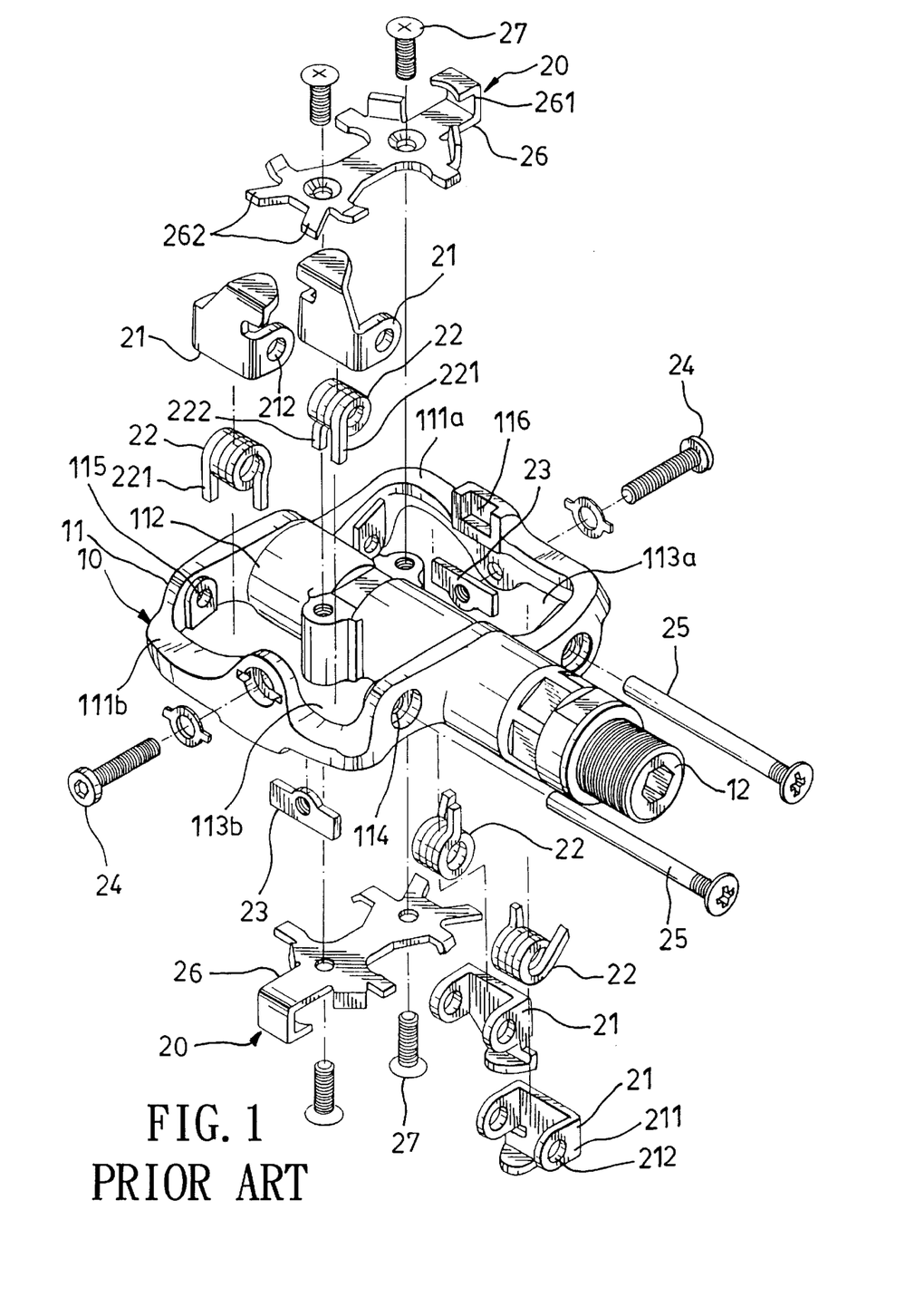
FIG. 1 is an exploded perspective view of a conventional bicycle pedal assembly.

Referring to FIG. 1, a conventional bicycle pedal assembly 10 is shown to include a rectangular pedal body 11 having front and rear portions 111a, 111b along a treading direction, and a central tubular portion 112 extending between and parallel to the front and rear portions 111a, 111b. The central tubular portion 112 has a co-axial spindle 12 for mounting on a bicycle pedal shaft (not shown). The front and rear portions 111a, 111b and the central tubular portion 112 cooperatively define front and rear accommodating spaces 113a, 113b. Each of the upper surface of the front portion 111a and the lower surface of the rear portion 111b is formed with a receiving cavity 116 (only the one in the front portin 111a is shown).

The bicycle pedal assembly 10 further includes a pair of anchoring units 20, each having two anchoring members 21 accommodated in the respective one of the front and rear accommodating spaces 113a, 113b. Each of the anchoring units 20 further includes two biasing members 22, an adjusting plate 23, an adjusting bolt 24, a mounting axle 25, and a positioning plate 26. Each of the anchoring members 21 has two side walls 211 which define a space to receive a respective one of the biasing members 22. Each side wall 211 has a through hole 212 for passage of the mounting axle 25 therethrough. Each of the front and rear portions 111a, 111b has two aligned mounting holes 114 and 115. The axles 25 pass through the mounting holes 114 and 115 and the through holes 212 formed in the side walls 211 of the anchoring members 21 to pivotably mount the respective one of the anchoring members 21 on the front and rear portions 111a, 111b, respectively, with each of the biasing members 22 being sleeved on the respective one of the axles 25. The biasing members 22 bias the anchoring members 21 against rotation when a rearward end 33 of a cleat unit 30 (see FIGS. 2 and 3) presses on the anchoring members 21. The cleat unit 30 is fixed to a bottom surface of a cyclist's shoe (not shown in the drawings) by a locking member 31, as shown in FIGS. 2 and 3.

Figure 2:
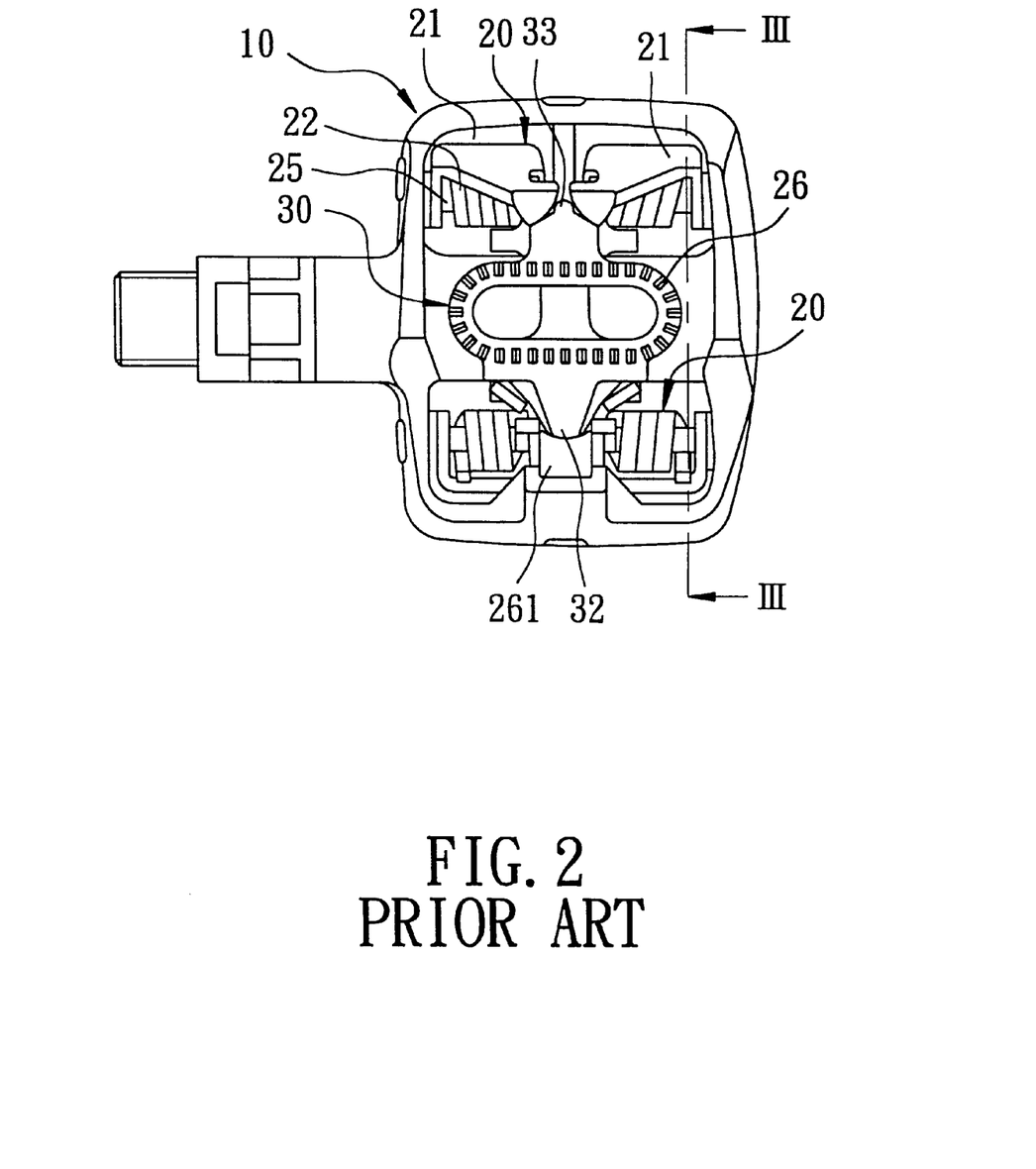
FIG. 2 is an assembled top plan view of the conventional bicycle pedal assembly.
Figure 3:
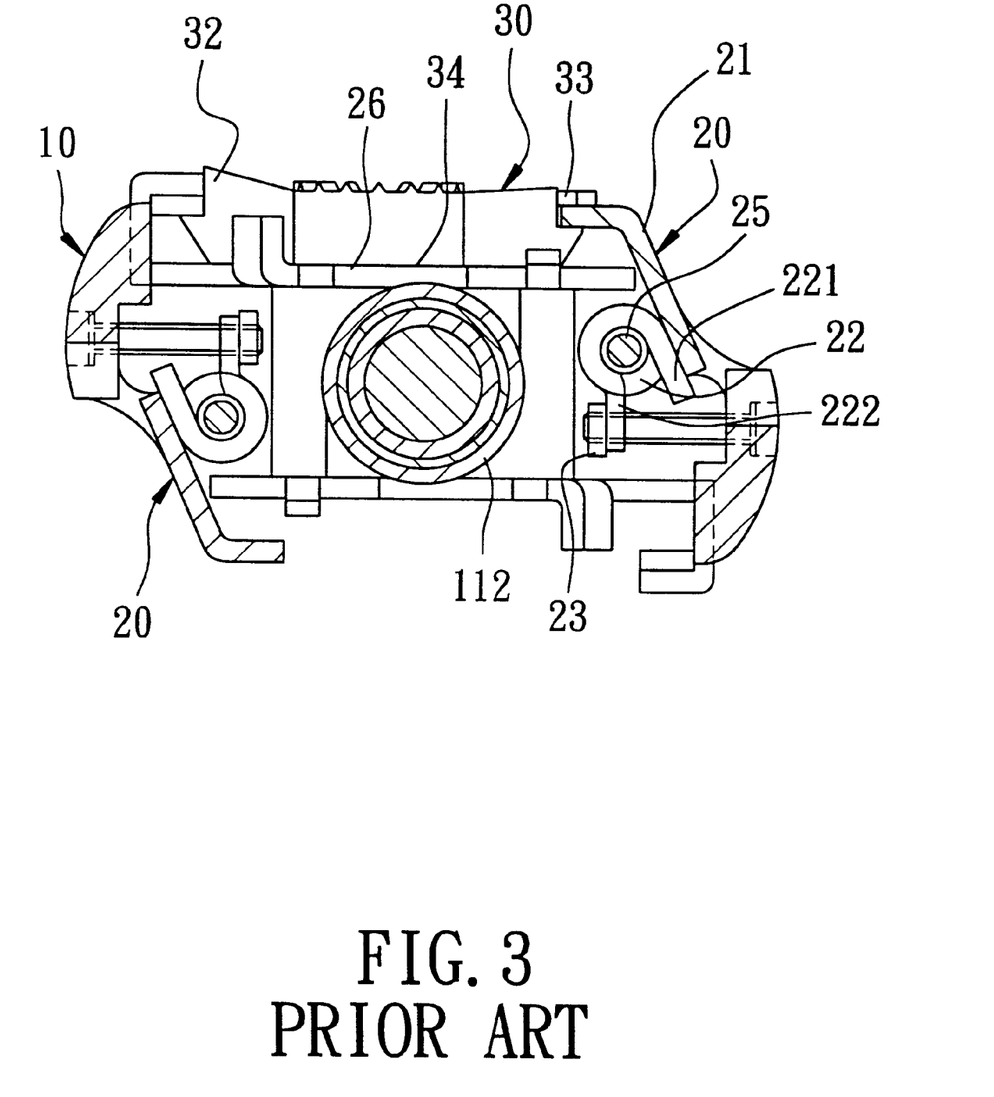
FIG. 3 is a cross-sectional view taken along line III—III of FIG. 2.

Referring to FIGS. 2 and 3, when the biasing members 22 are mounted on the respective one of the anchoring members 21, a secured end 221 of each of the biasing members 22 abuts closely against the respective one of the anchoring members 21, and an adjusting end 222 thereof is secured to the adjusting plate 23. The adjusting bolt 24 is threaded into a threaded hole formed in the adjusting plate 23 for adjusting the tension of the biasing members 22. When the adjusting bolt 24 is threaded into or out relative to the adjusting plate 23, the adjusting plate 23 will move toward or away from the tubular portion 112 along the adjusting bolt 24, thereby resulting in the concurrent movement of the adjusting end 222 which is secured on the adjusting plate 23. As a result, the tension of the biasing members 22 can be adjusted.

The positioning plate 26 of each of the anchoring units 20 is mounted fixedly on the tubular portion 112 by a pair of screws 27. Each of the positioning plates 26 has a contacting base for contacting the bottom surface of the cleat unit 30, a front stop portion 261 which extends upwardly from the contacting base and which is received in the respective one of the receiving cavities 116, and a pair of rear stop portions 262. The rear stop portions 262 abut against the anchoring members 21.

In order to engage the cleat unit 30 to the pedal assembly 10, the forward end 32 of the cleat unit 30 first engages the front stop portion 261 of the positioning plate 26. Then, the cleat unit 30 is rotated about the forward end 32 to move the rearward end 33 thereof into engagement with the anchoring members 21. Since the anchoring members 21 are pressed away by the rearward end 33 of the cleat unit 30, a biasing force generated by the biasing members 22 will be applied to the rearward end 33 of the cleat unit 30. As a result, the cleat unit 30 is clamped between the positioning plate 26 and the anchoring members 21. In order to disengage the cleat unit 30 from the bicycle pedal assembly 10, the cleat unit 30 is rotated about the forward end 32 thereof to slide the rearward end 33 relative to the anchoring members 21. As a result, the cleat unit 30 can be released from the positioning plate 26 and the anchoring members 21.

The bicycle pedal assembly 10, though capable of functioning to releaseably engage the cleat unit 30, has following disadvantages:

1. When the cleat unit 30 engages the bicycle pedal assembly 10, since the bottom surface 34 of the cleat unit 30 closely contacts the upper surface of the positioning plate 26, as shown in FIG. 3, it takes the cyclist more effort to release the cleat unit 30 from the bicycle pedal assembly 10.

2. Since the bottom surface 34 of the cleat 30 contacts closely the upper surface of the positioning plate 26, disengagement of the cleat unit 30 from the pedal assembly 10 can not be smoothly performed.

3. Since the bottom surface 34 of the cleat unit 30 contacts closely the upper surface of the positioning plate 26, dirt is easily stuck between the positioning plate 26 and the biasing members 22, between the biasing members 22 and the anchoring members 21, and between the cleat unit 30 and the positioning plate 26. Thus, cleanliness of the pedal assembly is hard to maintain, and precise movement of the moving parts of the pedal assembly 10 is not ensured.

4. Since each of the anchoring units 20 includes two anchoring members 21 and a positioning plate 26 for engaging the cleat unit 30, the number of components that constitute the bicycle pedal assembly 10 is relatively large, and the structure of the pedal assembly 10 is complicated, thus resulting in a time-consuming assembly procedure and in high production costs.

In view of the above disadvantages, it would be desirable to provide a less complicated bicycle pedal assembly which requires less effort to release the cleat unit from the pedal assembly and which is easy to maintain.

SUMMARY OF THE INVENTION

Therefore, the object of the present invention is to provide a bicycle pedal assembly which requires less effort to releases the cleat unit from the pedal assembly.

Another object of this invention is to provide a bicycle pedal assembly which includes a relatively small number of components and which is easy to assemble.

Still another object of this invention is to provide a bicycle pedal assembly having a relatively low production cost.

The bicycle pedal assembly of this invention, which is adapted to be mounted on a bicycle pedal shaft and which is adapted to engage a cleat unit having forward and rearward ends, comprises: a one-piece pedal body including a tubular portion adapted to be mounted rotatably on the bicycle pedal shaft that extends in a longitudinal direction, and a front pair and a rear pair of left and right lateral walls extending respectively from the tubular portion forward and rearward in a first transverse direction relative to the longitudinal direction, each of the lateral walls having upper and lower surfaces opposite to each other in a second transverse direction relative to both the first transverse direction and the longitudinal direction; front and rear anchoring frames, each including upper and lower engaging walls spaced apart from each other in the second transverse direction, and left and right mounting walls interposed between the upper and lower engaging walls, and spaced apart from each other in the longitudinal direction, the mounting walls of the front and rear anchoring frames being mounted pivotally on a respective one of the front and rear pairs of left and right lateral walls, the upper engaging wall of the front anchoring frame and the lower engaging wall of the rear anchoring frame being formed with a first anchoring portion, the upper engaging wall of the rear anchoring frame and the lower engaging wall of the front anchoring frame being formed with a second anchoring portion, the first anchoring portion on each of the anchoring frames facing the second anchoring portion on the other one of the anchoring frames and cooperating therewith so as to be adapted to engage the forward and rearward ends of the cleat unit, respectively, and retain the cleat unit on the pedal body; and front and rear biasing members for biasing a respective one of the front and rear anchoring frames against rotation relative to the pedal body when the rearward end of the cleat unit is forced into engagement with the second anchoring portion of the respective one of the front and rear anchoring frames.

BRIEF DESCRIPTION OF THE DRAWINGS

The features and advantages of the present invention will be described in more detail with reference to the accompanying drawings which illustrate the preferred embodiment of this invention, wherein.

DETAILED DESCRIPTION OF THE PREFERRED EMBODIMENT

Figure 4:
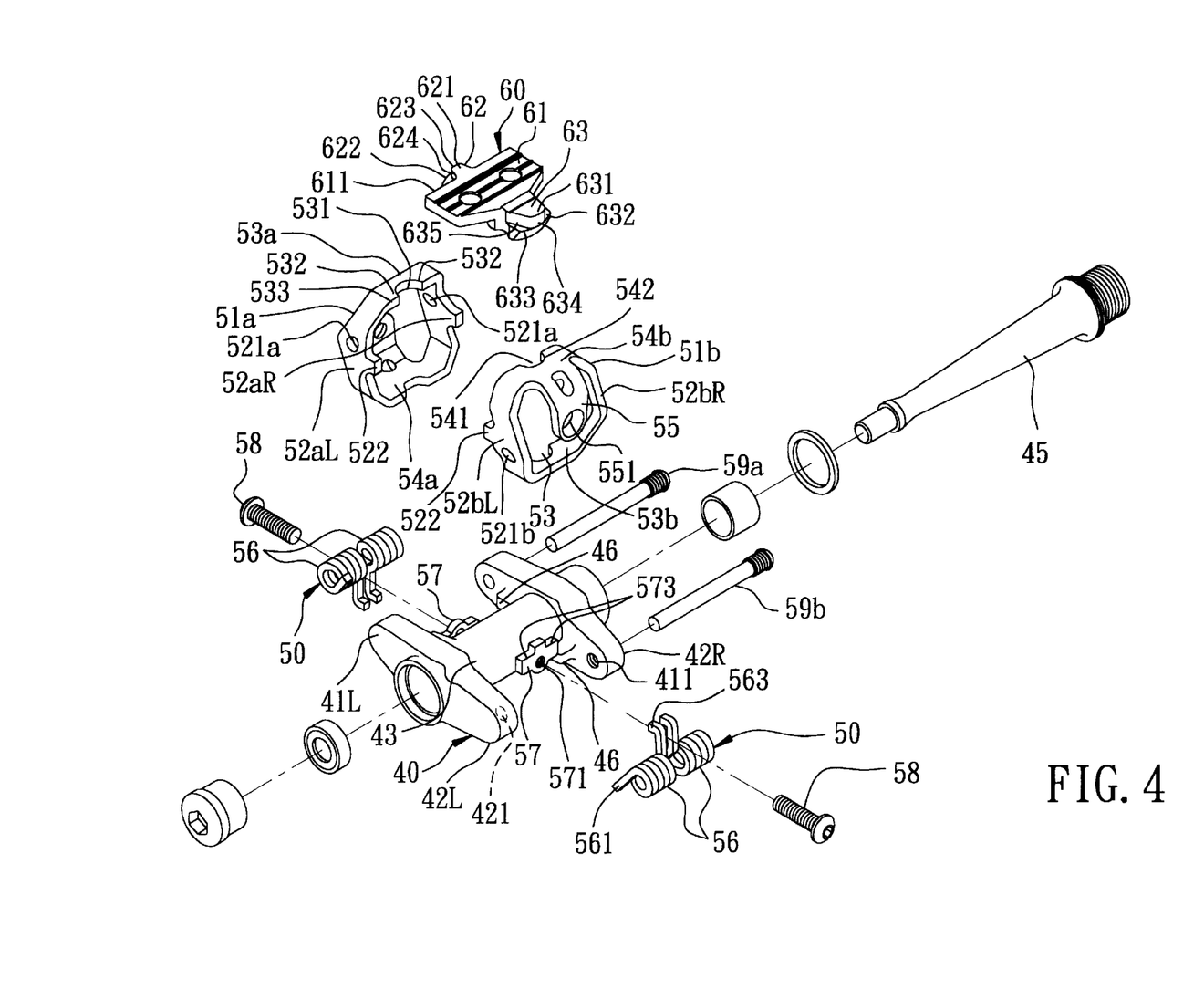
FIG. 4 is an exploded perspective view of the preferred embodiment of a bicycle pedal assembly of this invention.
Figure 5:
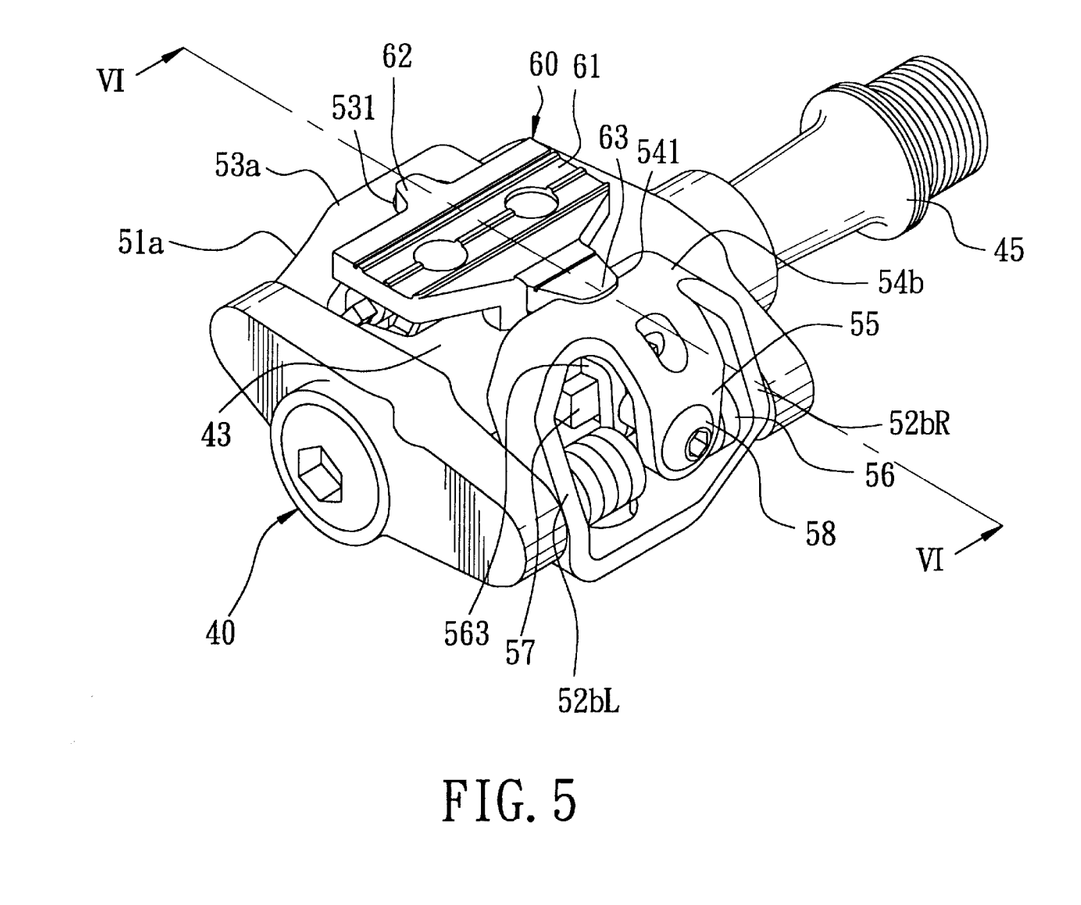
FIG. 5 is an assembled perspective view of the bicycle pedal assembly.

Referring to FIGS. 4 and 5, the preferred embodiment of a bicycle pedal assembly of this invention is shown to include a one-piece pedal body 40, front and rear anchoring frames 51a, 51b, and front and rear biasing members 50. The one-piece pedal body 40 has a tubular portion 43 extending in a longitudinal direction parallel to the axis of a bicycle pedal shaft (not shown) on which the bicycle pedal assembly is mounted, a front pair of left and right lateral walls 41L, 41R, and a rear pair of left and right lateral walls 42L, 42R. The front pair of left and right lateral walls 41L, 41R extend forward from the tubular portion 43 in a first transverse direction relative to the longitudinal direction, while the rear pair of left and right lateral walls 42L, 42R extend rearward from the tubular portion 43 in the first transverse direction. The tubular portion 43 is rotatably mounted on the bicycle pedal shaft by means of a spindle 45 which is mounted inside the tubular portion 43. Each of the lateral walls 41L, 41R, 42L, 42R has upper and lower surfaces opposite to each other in a second transverse direction relative to both the first transverse direction and the longitudinal direction. Each of the left lateral walls 41L, 42L is formed with a mounting hole 421, and each of the right lateral walls 41R, 42R is formed with a threaded hole 411. The mounting holes 421 of the left walls 41L, 42L are aligned with the corresponding one of the threaded holes 411 in the right lateral walls 41R, 42R in the longitudinal direction.

The front anchoring frames 51a includes an upper engaging wall 53a and a lower engaging wall 54a which are spaced apart from each other in the second transverse direction, and a left mounting wall 52aL and a right mounting wall 52aR interposed between the upper encaging wall 53a and the lower engaging wall 54a and spaced apart from each other in the longitudinal direction. The mounting walls 52aL and 52aR of the front anchoring frames 51a are mounted pivotally on the front pair of left and right lateral walls 41L, 41R by a front axle 59a which extends in the longitudinal direction and which passes through the threaded hole 411 in the right lateral wall 41R, aligned mounting holes 521a in the right and left anointing walls 52aR, 52aL of the front anchoring frame 51a, and into the mounting hole 421 in the left lateral wall 41L.

As with the front anchoring frame 51a, the rear anchoring frame 51b includes an upper engaging wall 54b and a lower engaging wall 53b which are spaced apart from each other in the second transverse direction, and a left mounting wall 52bL and a right mounting wall 52bR interposed between the upper engaging wall 54b and the lower engaging wall 53b and spaced apart from each other in the longitudinal direction. The mounting walls 52bL and 52bR of the rear anchoring frame 51b are mounted pivotally on the rear pair of left and right lateral walls 42L, 42R by a rear axle 59b which extends in the longitudinal direction and which passes through the threaded hole 411 in the right lateral wall 42R, aligned mounting holes 521b in the mounting walls 52bL, 52bR of the rear anchoring frame 51b, and into the mounting hole 421 in the left lateral wall 42L.

Preferably, the aligned mounting holes 521a of the front anchoring frame 51a are spaced apart in the second transverse direction from the upper engaging wall 53a by a distance shorter than that from the lower engaging wall 54a, while the aligned mounting holes 521b of the rear anchoring frame 51b are spaced apart in the same direction from the lower engaging wall 53b by a distance shorter than that from the upper engaging wall 54b.

Each of the upper engaging wall 53a of the front anchoring frame 51a and the lower engaging wall 53b of the rear anchoring frame 51b is formed with a first anchoring portion 531, and each of the upper engaging wall 54b of the rear anchoring frame 51b and the lower engaging wall 54a of the front anchoring frame 51a is formed with a second anchoring portion 541. The first anchoring portion 531 on one of the anchoring frames 51a or 51b faces the second anchoring portion 541 on the other one of the anchoring frames 51b or 51a and cooperates therewith so as to be adapted to engage a forward end 62 and a rearward end 63 of the cleat unit 60, respectively, to retain the cleat unit 60 on the pedal body 40.

Each of the first anchoring portions 531 is formed with two slanted side surfaces 532 that are inclined relative to the first transverse direction. Two pressed surfaces 533 extend respectively from the slanted side surfaces 532 and have a normal direction substantially parallel to the first transverse direction. Each of the second anchoring portions 541 is formed with two slanted side surfaces 542 opposing to the two slanted side surfaces 532.

Preferably, the rear anchoring frame 51b is of the same construction as an inverted state of the front anchoring frame 51a which is turned by a 180 degree angle about the first transverse direction.

Figure 6:
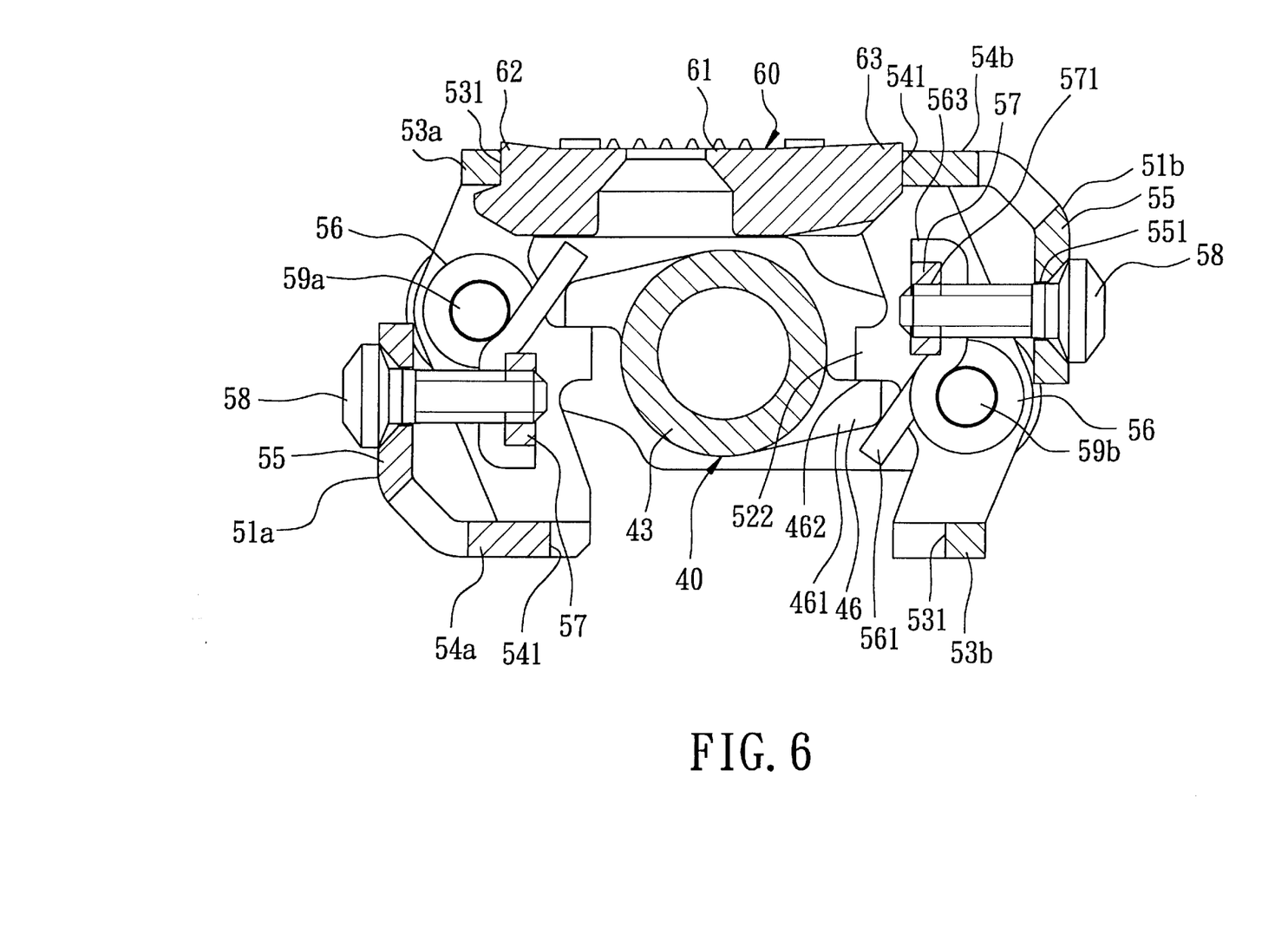
FIG. 6 is a cross-sectional view taken along line VI—VI of FIG. 5.

The front and rear biasing members 50, each preferably composed of two coiled torsion springs 56, are provided in the front and rear anchoring frames 51a, 51b and are sleeved on the front and rear axles 59a, 59b, respectively. Each of the biasing members 50 has a secured end 561 secured to a barrier portion 46 of the pedal body 40, and an anchored end 563 spaced apart from the secured end 561 in the longitudinal direction. Referring to FIG. 6, the secured end 561 abuts against the barrier portions 46 provided adjacent to the four corners defined by the lateral walls 41L, 42L, 41R, 42R and the tubular portion 43, and the anchored end 563 is secured on a nut portion 57. The anchored ends of the two coiled torsion springs 56 of each biasing member 50 respectively engage two notched 573 in the respective nut portion 57. The biasing members 50 are provided for biasing the respective one of the front and rear anchoring frames 51a, 51b against rotation relative to the pedal body 40 when the rearward end 63 of the cleat unit 60 is forced into engagement with the second anchoring portion 541 of the respective one of the front and rear anchoring frames 51a, 51b.

A pair of front and rear tension adjusting members for adjusting the tension of the respective one of the biasing members 50 are provided. Each of the tension adjusting members includes a screw member 58 and the nut portion 57. Each of the screw members 58 extends through a lug hole 551 in a lug portion 55 on the respective one of the anchoring frames 51a, 51b. In the front anchoring frame 51a, the lug portion 55 extends inwardly from the lower engaging wall 54a, while in the rear anchoring frame 51b, the lug portion 55 extends inwardly from the upper engaging wall 54b. It is within the contemplation of this invention that the lug portion 55 can extend from any one of the right and left mounting walls, and upper and lower engaging walls of the anchoring frame, as long as a lug hole 551 is formed therein for the passage of the respective one of the screw members 58. Each of the screw members 58 has its leading end screwed into a threaded hole 571 in the nut portion 57.

As the screw members 58 are screwed in or screwed out of the threaded hole 571 relative to the nut portion 57, the anchored end 563 of the respective one of the biasing members 56 will be pressed by or relieved from thrust of the nut portion 57 so as to adjust the tension of the respective one of the biasing members 56.

The mounting walls 52aL, 52aR, 52bL, 52bR of the anchoring frames 51a, 51b are formed integrally with a stop portion 522, which extend therefrom in a direction towards the tubular portion 53 for engaging the adjacent barrier portion 46. The barrier portion 46 is formed integrally with and extends from one of the lateral walls 41L, 41R, 42L, 42R of the pedal body 53 towards the corresponding stop portion 522. The stop portion 522 and the barrier portion 46 cooperate to form a restricting member.

The arrangement and function of the restricting member will become clear by describing the operation of the rear anchoring frame 51b as an example, which is shown on the right side of FIG. 6. The barrier portion 46 has a first side 461 proximate to the first anchoring portion 531 of the lower engaging wall 53, and a second side 462 proximate to the second anchoring portion 541 of the upper engaging wall 54. The secured end 561 of the rear biasing member 56 abuts securely against the barrier portion 46 at the first side 461. The stop portions 522 of the rear anchoring frame 51b abut against the second side 462 of the adjacent barrier portions 46. With such an arrangement, the rear anchoring frame 51b can freely rotate clockwise when the rearward end 63 of the cleat unit 60 is inserted into and is retained by the second anchoring portion 541 of the rear anchoring frame 51b, but is restricted from rotating counterclockwise from its normal unbiased position because the downward movement of the stop portions 522 is restricted by the barrier portions 46. The front restricting member has the same arrangement such that the front anchoring frame 51a does not pivot about the front axle 59a when the forward end 62 of the cleat unit 60 is inserted into the first anchoring portion 531 of the front anchoring frame 51a.

The cleat unit 60 is provided with a fixing member 61 to be fixed to a bottom surface of a sole of a cyclist's shoe. The forward end 62 has an upper abutting part 621 and a lower stop part 622 which extends forwardly from a bottom surface of the upper abutting part 621 and which has a width larger than that of the upper abutting part 621, such that the upper abutting part 621 and the lower stop part 622 define a shoulder configuration. The upper abutting part 621 has two slanted side surfaces 624 and an abutting surface 623 therebetween. The rearward end 63 of the cleat unit 60 has an upper pressing part 631 and a wider lower stop part 632. The lower stop part 632 has a slanted guiding surface 633 which extends upward and rearward from a bottom surface of the lower stop part 632, as clearly seen in FIG. 8. The upper pressing part 631 has two slanted side surfaces 635 and an abutting surface 634 therebetween.

Hereinafter describes the engaging operation of the cleat unit 60 into the bicycle pedal assembly.

Figure 7:
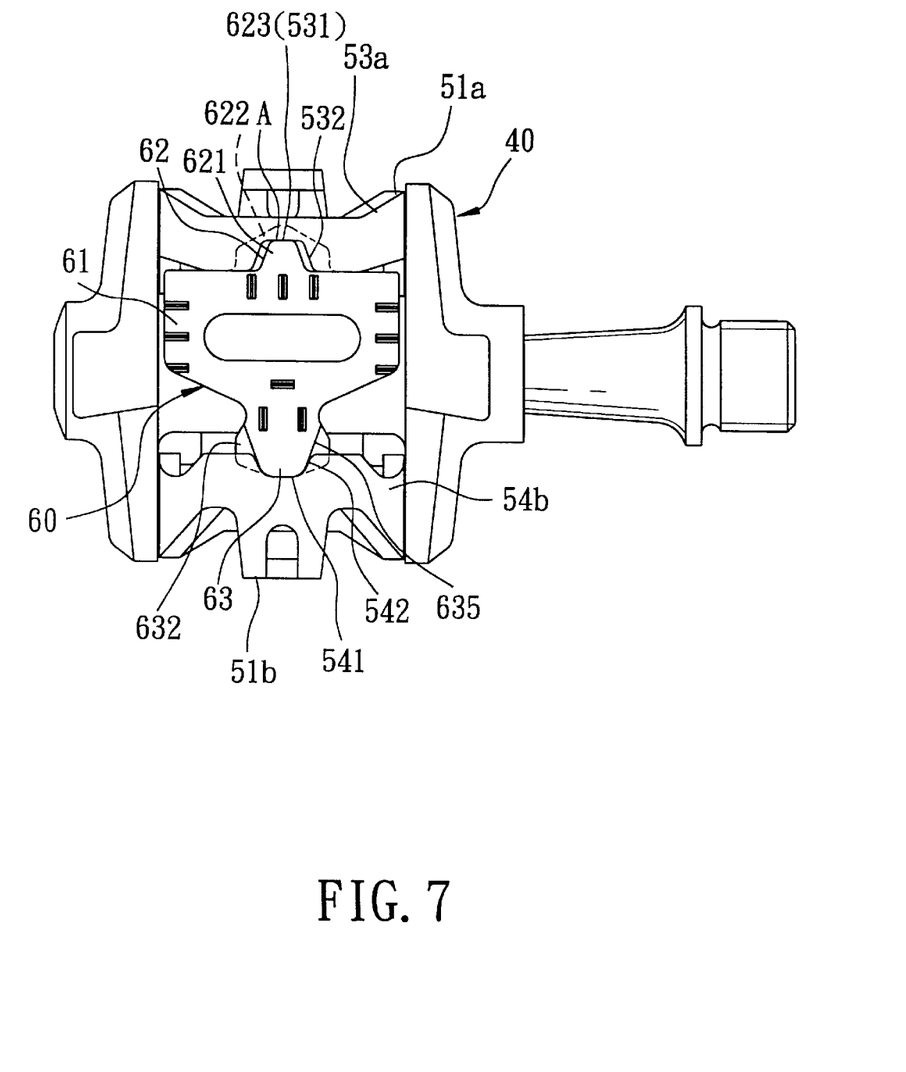
FIG. 7 is a schematic top plan view, showing the engagement between the cleat unit and the bicycle pedal assembly.
Figure 8:
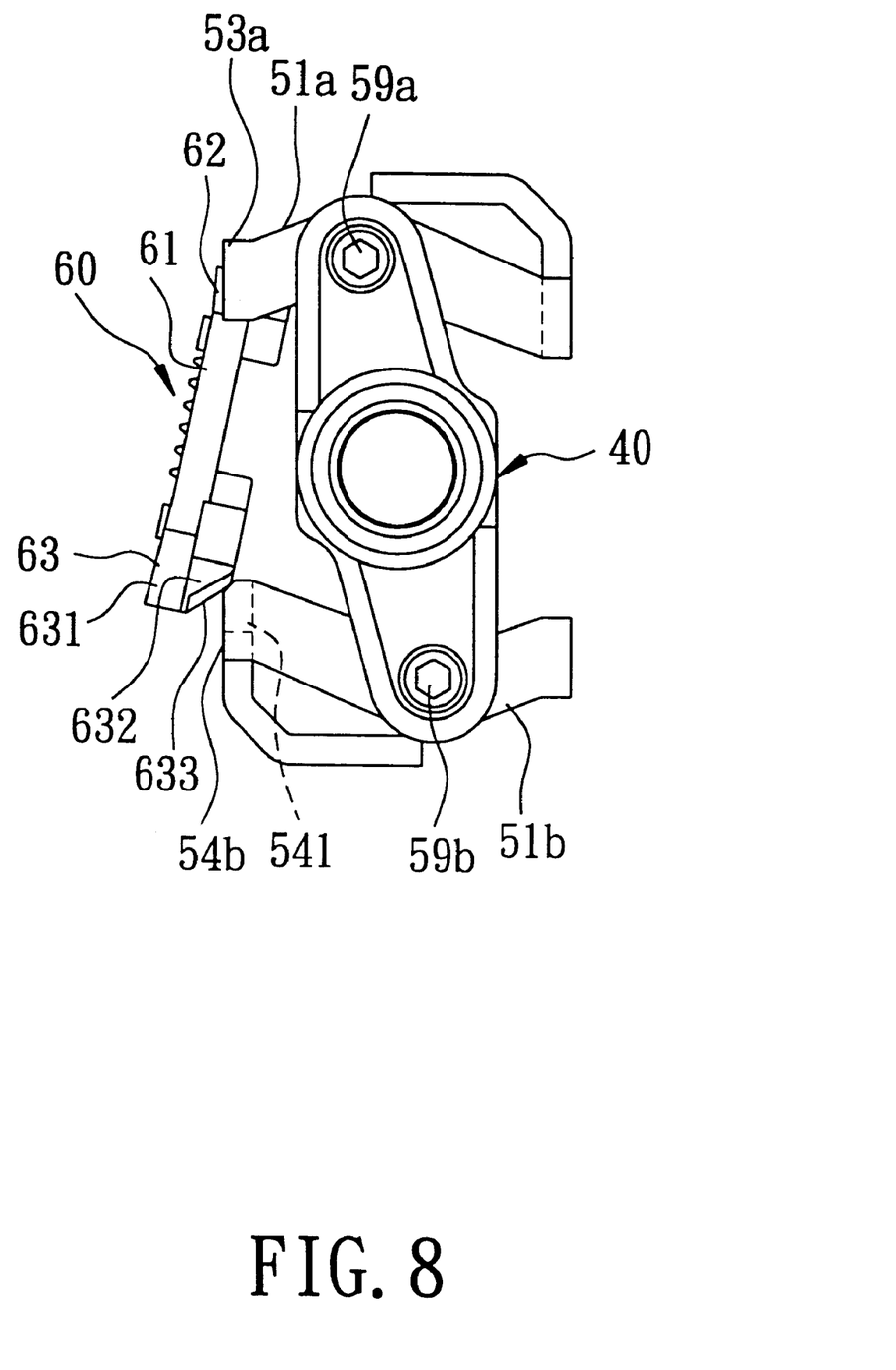
FIG. 8 is a side view of the bicycle pedal assembly.

Referring to FIGS. 7 and 8, when the cleat unit 60 is about to engage the bicycle pedal assembly, the forward end 62 of the cleat unit 60 is first inserted into the first anchoring portion 531 of the upper engaging wall 53a of the front anchoring frame 51a. Subsequently, the cleat unit 60 is rotated about the forward end 62 so as to move the rearward end 63 thereof right above the second anchoring portion 541 of the upper engaging wall 54b of the rear anchoring frame 51b. With the help of the slanted guiding surface 633 on the rearward end 63, the rearward end 63 of the cleat unit 60 is easily inserted into the second anchoring portion 541 of the upper engaging wall 54b of the rear anchoring frame 51b by simply pressing the cleat unit 60 downward.

Due to the pressing, the rear anchoring frame 51b, together with the biasing member 50, are pressed to pivot about the rear axle 59b away from the cleat unit 60. Since the biasing member 56 has the secured end 561 secured to the pedal body 43, the pivoting movement of the biasing member 50 about the rear axle 59b will result in a biasing force for biasing against the pivoting movement of the rear anchoring frame 51b. As a result, the cleat unit 60 can be clamped between the first anchoring portion 531 of the front anchoring frame 51a and the second anchoring portion 541 of the rear anchoring frame 51b, and can be suspended over the pedal body 43 of the bicycle pedal assembly. Moreover, with the confinement of the slanted side surfaces 542 of the rear anchoring frame 51b adjacent to the slanted side surfaces 635 of the rearward end 63 of the cleat unit 60, the cleat unit 60 is prevented from being undesirably released from the bicycle pedal assembly.

It is noted that, in pressing the rearward end 63 of the cleat unit 60 into engagement with the second anchoring portion 541 of the rear anchoring frame 51b, the cleat unit 60 is pivoted about a contacting area as indicated by (A) in FIG. 7. The contacting area (A) lies between the abutting surface 623 of the forward end 62 of the cleat unit 60 and the first anchoring portion 531 of the front anchoring frame 51a. When the cleat unit 60 is pivoted about the contacting area (A) in a direction parallel to the longitudinal direction, the slanted guiding surface 633 of the rearward end 63 of the cleat 60 slides on the second anchoring portion 541 of the rear anchoring frame 51b and is easily inserted therein.

Figure 9:
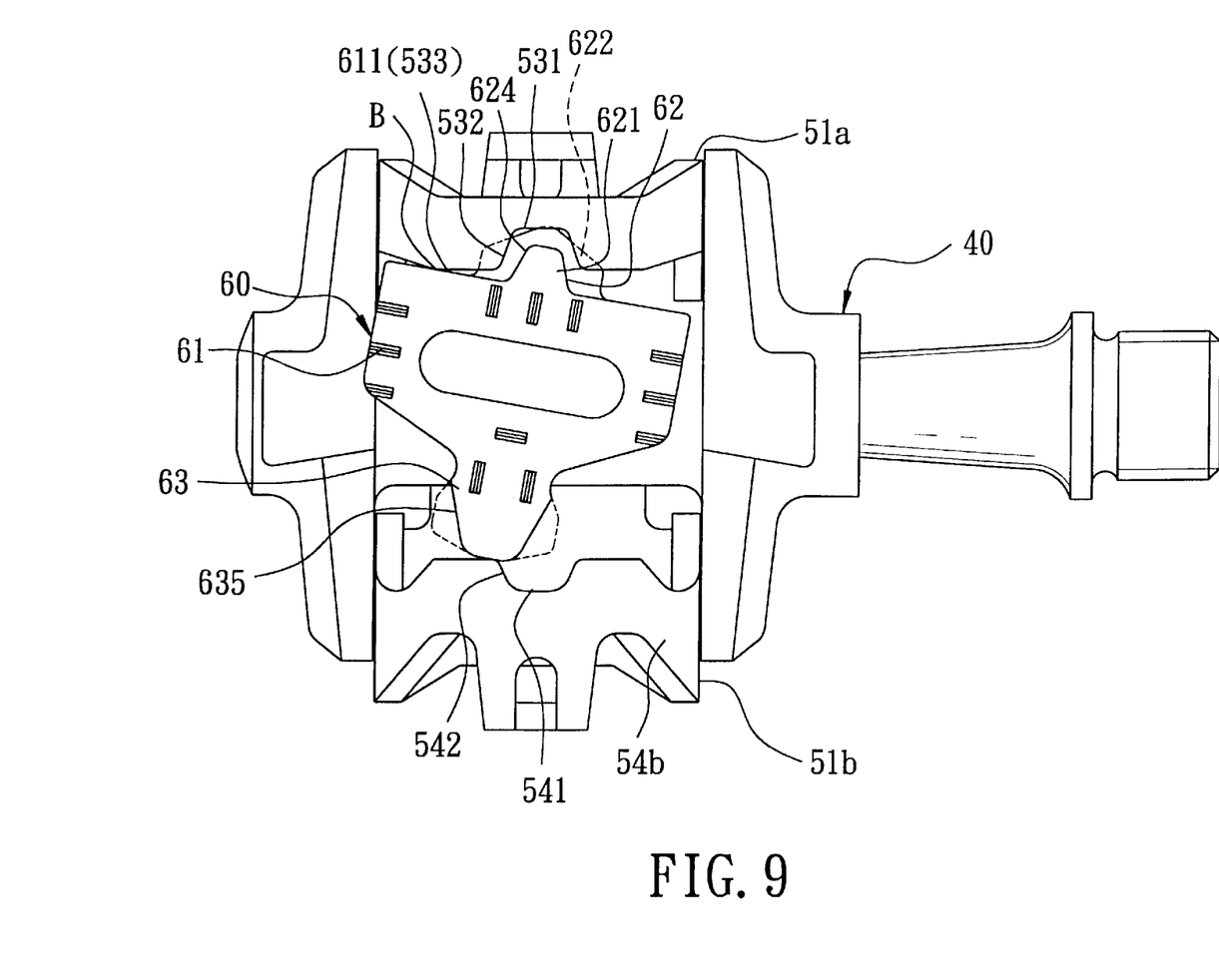
FIG. 9 is a top plan view of the bicycle pedal assembly, showing the disengagement of the cleat unit from the bicycle pedal assembly.

Referring to FIG. 9, to release the cleat unit 60 from the anchoring frames 51a and 51b, the cyclist first pushes the forward end 62 of the cleat unit 60 forward to move abutting part 621 thereof toward the first anchoring portion 531 of the front anchoring frame 51a. At the same time, the cleat unit 60 is rotated to make the slanted side surfaces 624 thereof to slide relative to the slanted side surfaces 532 of the front anchoring frame 51a. Then, the cleat unit 60 is rotated about a contacting area as indicated by (B) in FIG. 9. The contacting area (B) lies between a front surface 611 of the cleat unit 60 and the pressed surface 533 of the upper engaging wall 53. As the cleat unit 60 is rotated about the contacting area (B), the slanted side surfaces 624 of the forward end 62 of the cleat unit 60 slide on the slanted side surface 532, and the slanted side surface 635 of the rearward end 63 of the cleat unit 60 slides on the slanted side surface 542 of the rear anchoring frame 51b. As a result, the rear anchoring frame 51b is pressed outwardly to pivot about the rear axle 59b, and it is possible to disengage the cleat unit 60 from the rear anchoring frame 51b to permit the release of the cleat unit 60 from the bicycle pedal assembly at this time.

After the cleat unit 60 is released, the rear anchoring frame 51b will move back to its normal position by means of the biasing force of the biasing members 50. Since the rear restricting member prevents the rear anchoring frame 51b from moving beyond its normal position, the rear anchoring frame 51b will not be offset from its normal position.

With such a construction, the bicycle pedal assembly of this invention provides several advantages:

1. Since the cleat unit is clamped between the anchoring frames and is suspended on the pedal body, the contact area between the cleat unit and the bicycle pedal assembly is decreased. Therefore, the force required to release the cleat unit from the anchoring frames is significantly decreased.

2. During engaging process, the cleat unit 60 is inserted into the anchoring frames 51a, 51b by sliding the slanted guiding surface 633 of the rearward end 63 downward relative to the upper engaging wall 54b of the rear anchoring frame 51b. During the disengaging process, the cleat unit 60 is released from the anchoring frames 51a, 51b by sliding the slanted side surface 624 of the forward end 62 of the cleat unit 60 on the slanted side surface 532 of the front anchoring frame 51a, and by sliding the slanted side surface 635 of the rearward end 63 of the cleat unit 60 on the slanted side surface 542 of the rear anchoring frame 51b. With the help of sliding movement, engagement and disengagement of the cleat unit 60 into and from the anchoring frames 51a, 51b are smoothly and easily accomplished.

3. Since the anchoring frames are integrally formed, and since the cleat unit 60 is suspended on the pedal body, dirt is unlikely to be stuck onto the bicycle pedal assembly. Therefore, smooth operation of the bicycle pedal assembly will not be hampered.

4. No positioning plates, which are necessary components in the conventional bicycle pedal body, are required. Thus, a simpler structure is realized, the assembly time is reduced, and the production cost is lowered.

It should be understood that the above description is intended to be illustrative and not restrictive. A variety of modifications will be apparent to those skilled in the art within the spirit and scope of the invention as defined in the appended claims.

I claim:

1. A bicycle pedal assembly adapted to be mounted on a bicycle pedal shaft and adapted to engage a cleat unit having forward and rearward ends, said bicycle pedal assembly comprising:

a one-piece pedal body including a longitudinal tubular portion, and a front pair and a rear pair of left and right lateral walls extending transversely and oppositely from said tubular portion;

front and rear anchoring frames respectively disposed between said front and rear pairs of left and right lateral walls, each of said front and rear anchoring frames being formed as a four-sided loop-shaped wall structure which includes upper and lower engaging walls spaced apart from each other, and left and right mounting walls connected to said upper and lower engaging walls, said mounting walls of said front and rear anchoring frames having aligned mounting holes, respectively, and a lug portion which extends as a cantilever between said left and right mounting walls substantially in a direction from one of said upper and lower engaging walls toward the other one of said upper and lower engaging walls, said lug potion being formed with a lug hole, said lug hole having a center axis substantially perpendicular to the cross-sectional plane of the four-sided loop-shaped wall structure of a respective one of said front and rear anchoring frames;

front and rear axles which extend through said mounting holes longitudinally of said tubular portion and which have opposite ends respectively mounted on said front and rear pairs of left and right lateral walls;

coiled torsion springs respectively sleeved around said front and rear axles and disposed within said four-sided loop-shaped wall structures of said front and rear anchoring frames, each of said torsion springs having a secured end abutting against the pedal body and an anchored end extending between said tubular portion and a respective one of said front and rear anchoring frames; and screw members respectively extending from said lug portions toward said anchored ends of said torsion springs and passing through said lug holes in said lug portions, said screw members respectively having nut portions threadedly engaging therewith for compressing and adjusting tension of said torsion springs.

2. The bicycle pedal assembly according to claim 1 wherein each of said nut portions has two notches which are offset from and which are spaced apart angularly about a corresponding one of said screw members, a pair of said coiled torsion springs being sleeved around each of said front and rear axles and having said anchored ends thereof respectively engaging said notches.

* * * * *